(12) United States Patent
Govindaraju et al.

(10) Patent No.: US 11,463,523 B2
(45) Date of Patent: Oct. 4, 2022

(54) DYNAMIC CHAIN OF ACTIONS FOR IOT DEVICES

(71) Applicant: VMWARE, INC., Palo Alto, CA (US)

(72) Inventors: Agila Govindaraju, Bangalore (IN);
Ashutosh Dwivedi, Bangalore (IN);
Prashant Shubham, Bangalore (IN);
Swarnadeep Banerjee, Bangalore (IN);
Mahesh Kanote, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 4 days.

(21) Appl. No.: 17/013,942

(22) Filed: Sep. 8, 2020

(65) Prior Publication Data
US 2022/0030066 A1    Jan. 27, 2022

(30) Foreign Application Priority Data

Jul. 21, 2020  (IN) .............................. 202041031143

(51) Int. Cl.
*H04L 67/12* (2022.01)
*G16Y 40/30* (2020.01)
*G16Y 40/10* (2020.01)

(52) U.S. Cl.
CPC .............. *H04L 67/12* (2013.01); *G16Y 40/10* (2020.01); *G16Y 40/30* (2020.01)

(58) Field of Classification Search
CPC ........ H04L 67/12; G16Y 40/10; G16Y 40/30; H04W 4/38; H04W 4/70
See application file for complete search history.

(56) References Cited

U.S. PATENT DOCUMENTS

| | | | |
|---|---|---|---|
| 10,523,516 B1 * | 12/2019 | Gupta | H04L 41/14 |
| 2017/0054810 A1 * | 2/2017 | Evans | H04L 41/0816 |
| 2017/0201585 A1 * | 7/2017 | Doraiswamy | H04L 67/10 |
| 2019/0281132 A1 * | 9/2019 | Sethuraman | H04W 12/10 |
| 2020/0242199 A1 * | 7/2020 | Ploennigs | G06F 40/30 |
| 2021/0243068 A1 * | 8/2021 | R | H04L 41/0893 |

* cited by examiner

*Primary Examiner* — Jason D Recek
(74) *Attorney, Agent, or Firm* — Thomas Horstemeyer, LLP

(57) ABSTRACT

Various examples are disclosed for performing dynamic chains of action for Internet-of-Things (IoT) devices. In some aspects, IoT event data is received from an IoT device. An IoT dependency graph is identified based on an initial IoT event specified by the IoT dependency graph. An IoT event subsequent to the initial IoT event is identified according to the IoT dependency graph. A command is transmitted to an IoT device to perform the IoT event.

20 Claims, 5 Drawing Sheets

DYNAMIC CHAIN OF ACTIONS FOR IOT DEVICES

RELATED APPLICATIONS

Benefit is claimed under 35 U.S.C. 119(a)-(d) to Foreign Application Serial No. 202041031143 filed in India entitled "DYNAMIC CHAIN OF ACTIONS FOR IOT DEVICES", on Jul. 21, 2020, by VMware, Inc., which is herein incorporated in its entirety by reference for all purposes.

BACKGROUND

The Internet-of-Things (IoT) refers to interrelated computing devices, sensors, and objects that are network-enabled such that they are periodically able to transfer data over a network. Some IoT architectures include three architectural layers, including a sensor layer, an edge system layer (also referred to as a "gateway layer"), and a server layer that may execute in a cloud hosted on the Internet. Notably, IoT solutions evaluate data collected from end devices at a cloud server layer, where alerts are triggered.

In an IoT deployment, variety of sensors, actuators, and other IoT devices can be deployed to take care of the entire process pipeline related to that industry. A set of operations or actions that can be performed are generally fixed depending on the model and version of a device. Command architectures can send individual commands but are poorly equipped to handle complex or dynamic sequences. Where alerts are triggered, the alerts can generally notify users of a condition or state of an IoT device. As a result, there is a need for more effective command architectures for IoT command sequencing.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to systems and methods for controlling a dynamic chain of actions for Internet-of-Things (IoT) devices. In an IoT deployment, variety of sensors, actuators, and other IoT devices can be deployed to take care of the entire process pipeline related to that industry. Command architectures can send individual commands, but existing architectures can be poorly equipped to handle complex, multiple-step, and dynamic sequences. As a result, there is a need for more effective command architectures for IoT command sequencing. However, the present disclosure provides mechanisms for controlling a dynamic chain of actions for IoT devices.

For example, the systems and methods described can tie a sequence of operations across a set of IoT devices, and across multiple edge devices. This can provide for a controlled and automated process pipeline. When an IoT device generates an event, the event can lead to a directed series of actions that can include actions performed in sequence and/or in parallel by the IoT device that generated the event, as well as other devices. This can prevent mistakes in a process pipeline.

Figure 1:
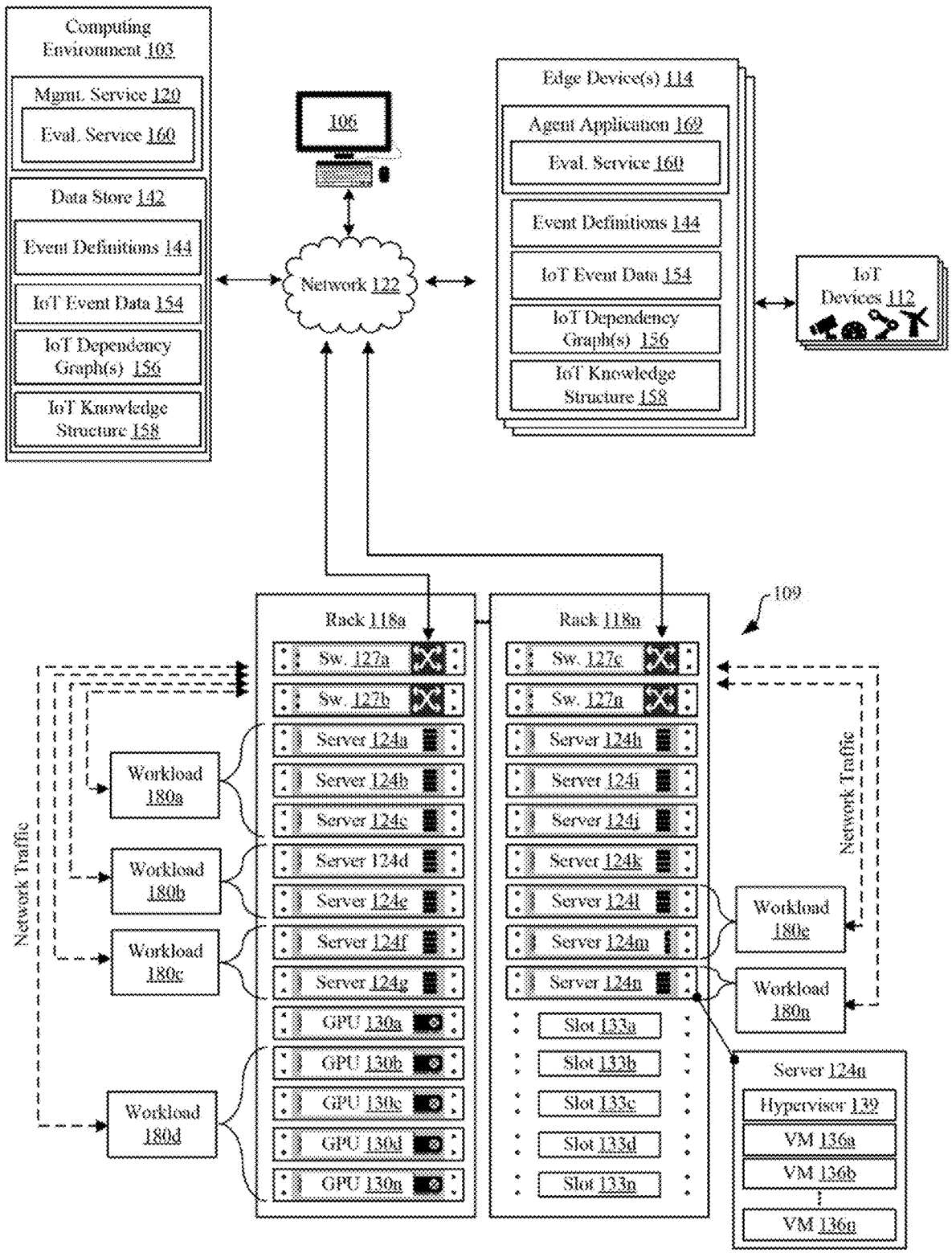
FIG. 1 is a drawing of an example of a networked computing environment that includes components that perform dynamic chains of actions for IoT devices.

Turning now to FIG. 1, an example of a networked environment 100 is shown. The networked environment 100 can include a computing environment 103, client devices 106, various computing systems 109, and IoT devices 112 having one or more sensors, and edge devices 114, in communication with one other over a network 122. The network 122 can include, for example, the Internet, intranets, extranets, wide area networks (WANs), local area networks (LANs), wired networks, wireless networks, other suitable networks, or any combination of two or more such networks.

The network 122 of the networked environment 100 can include satellite networks, cable networks, Ethernet networks, telephony networks, and other types of networks. The computing systems 109 can include devices installed in racks 118a . . . 118n (collectively "racks 118"), which can make up a server bank, aggregate computing system, or a computer bank in a data center or other like facility. In some examples, the computing systems 109 can include high-availability computing systems, which include a group of computing devices that acts as a single system and provides a continuous uptime. The devices in the computing systems 109 can include any number of physical machines, virtual machines, virtual appliances, and software associated therewith, such as operating systems, drivers, hypervisors, scripts, and applications.

The computing systems 109, and the various hardware and software components contained therein, can include infrastructure of the networked environment 100 that provides one or more computing services. Computing services can include alert services or other application programming interface (API) services. For instance, the computing services can provide an application programming interface that permits an application or service to generate, store, retrieve, delete or otherwise interact with alerts. The alerts may be stored in a data store 142 that can include memory accessible by one or more of a plurality of servers 124a . . . 124n (collectively "servers 124"). For instance, the data store 142 can include one or more relational databases, such as structured query language databases, non-SQL databases, time-series databases, or other relational or non-relational databases.

The computing environment 103 can include an enterprise computing environment that includes hundreds, or thousands of physical machines, virtual machines, and other software implemented in devices stored in racks 118, distributed geographically, and connected to one another through the network 122. As such, the computing environment 103 can be referred to as a distributed computing environment in some examples. It is understood that any virtual machine or virtual appliance is implemented using at least one physical device, such as a server or other computing device.

The devices in the racks 118 can include various physical computing resources. The physical computing resources can include physical computing hardware, such as memory and storage devices, servers 124, switches 127a . . . 127n, graphics cards having one or more GPUs 130a . . . 130n installed thereon, central processing units (CPUs), power supplies, and similar devices. The devices, such as servers 124 and switches 127, can have dimensions suitable for quick installation in slots 133a . . . 133n on the racks 118.

In various examples, the servers 124 can include requisite physical hardware and software to create and manage virtualization infrastructure, a cloud computing environment, an on-premise environment, and/or a serverless computing environment. Also, in some examples, the physical computing resources can be used to provide virtual computing resources, such as virtual machines or other software, such as a computing service.

Each server 124, such as representative server 124n, can act as a host in the networked environment 100, and thereby can include one or more virtual machines (VMs) 136a . . . 136n (collectively "virtual machines 136"). In some examples, a hypervisor 139 can be installed on a server 124 to support a virtual machine execution space. One or more virtual machines 136 can be concurrently instantiated and executed in the virtual machine execution space. The hypervisor 139 can include the ESX™ hypervisor by VMware®, the ESXi™ hypervisor by VMware®, or a similar hypervisor 139 in some examples. It is understood that the computing systems 109 can be scalable, meaning that the computing systems 109 in the networked environment 100 can increase or decrease dynamically to include or remove servers 124, switches 127, GPUs 130, power sources, and other components without downtime or otherwise impairing the performance of the computing services offered up by the computing systems 109.

Referring now to the computing environment 103, the computing environment 103 can include a server 124 or any other system providing computing capability. Alternatively, the computing environment 103 can include one or more computing devices that are arranged in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 109, it is understood that in some examples the computing environment 103 can be included as all of, or a part of, the computing systems 109.

For purposes of convenience, the computing environment 103 is sometimes referred to herein in the singular. Even though the computing environment 103 is referred to in the singular, it is understood that a plurality of computing environments 103 can be employed in the various arrangements as described above. As the computing environment 103 communicates with the computing systems 109 and the client devices 106 over the network 122. Additionally, in various examples, the computing environment 103 can be implemented in servers 124 of a rack 118 and can manage operations of a virtualized or cloud computing environment through interaction with the computing services.

The computing environment 103 can include a data store 142, which can include one or more databases in some examples. The data store 142 can include memory of the computing environment 103, mass storage resources of the computing environment 103, or any other storage resources on which data can be stored by the computing environment 103. The data store 142 can include memory of the servers 124 in some examples. The data store 142 can include one or more relational databases, such as structured query language databases, non-SQL databases, or other relational or non-relational databases. The data stored in the data store 142 can be associated with the operation of the various services or functional entities described below.

The data store 142 can include event definitions 144, which can include or specify actions, states, and sensor readings that can be identified based on IoT event data 154 received from IoT devices 112. IoT event data 154 can also include logical grouping information for each of the IoT devices 112, such as the edge device 114 through which it connects.

The event definitions 144 can refer to predefined events that are based on states, sensor readings, device parameters, and other actions or capabilities of an IoT device 112. An event definition 144 can correspond to an event or step of an IoT dependency graph 156. The evaluation service 160 of the management service 120 can identify that an event definition 144 has occurred based on the IoT event data 154. The evaluation service 160 can then identify an IoT dependency graph 156 that has an initial step or event that corresponds to that event definition 144. The evaluation service 160 can then guide a workflow according to the IoT dependency graph 156.

The IoT dependency graph 156 can specify a multiple-step-dependency workflow and/or a multiple-IoT-device workflow. A multiple-step-dependency workflow can be specified in an IoT dependency graph 156 in which at least two events are specified to occur in sequence prior to a final event. In other words, at least one event specified in the IoT dependency graph 156 can depend on a prerequisite sequence that includes multiple event steps. A multiple-IoT-device workflow can refer to a workflow that includes a sequence of events performed by multiple IoT devices 112.

Figure 2A:
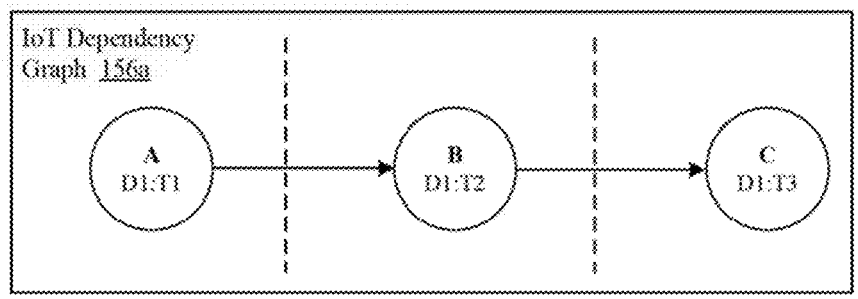
FIG. 2A is a drawing that illustrates an IoT dependency graph that specifies a dynamic chain of actions for IoT devices.
Figure 2B:
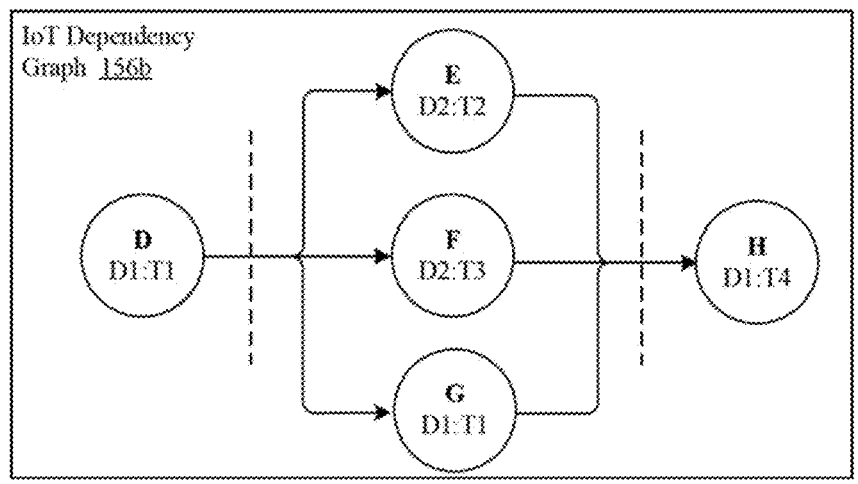
FIG. 2B is a drawing that illustrates another IoT dependency graph that specifies a dynamic chain of actions for IoT devices.

While an IoT dependency graph 156 can be represented in graphical form as shown in FIGS. 2A and 2B, the IoT dependency graph 156a can also be represented as a table, a linked list data structure, a markup language, or another code or data structure. A nonlimiting example of an IoT dependency graph 156 is provided in Table 1.

TABLE 1

```
{
    "sourceEdgeDeviceId": "deviceId",
    "sourceThingId": "thingId",
    "sourceAction": "action name",
    "sourceCondition": "memory > limit", (Optional)
    "destinationAction": [
        "action name1",
        "action name2"
    ],
    "destinationEdgeDeviceId": "deviceId",
    "destinationThingId": "thingId",
    "destinationCondition": "cpu < limit" (Optional)
}
```

The evaluation service 160 can analyze the IoT dependency graph 156 and read or retrieve command information from the IoT knowledge structure 158, which can include one or more tables, databases, or other data structures. The IoT knowledge structure 158 can specify a set of capabilities or actions that can be performed by of each of the IoT devices 112, as well as commands that cause the IoT device 112 to perform the action. The commands can be provided in an appropriate IoT device communication protocol. The evaluation service 160 can, for each step or event of the IoT dependency graph 156, identify the IoT device 112 and IoT device action specified. The evaluation service 160 can then identify appropriate commands and communication protocol that the evaluation service 160 can use to direct the IoT device 112 to perform the specified action, such as changing a configuration, providing a sensor parameter, activating an actuator, powering on, powering off, or other actions.

The IoT knowledge structure 158 can be seeded or populated by the management service 120. The management service 120 can collect information by querying or analyzing the IoT devices 112, or a network service associated with a manufacturer or provider of the IoT devices 112. Users can also manually enter or upload information into the IoT knowledge structure 158 through a console user interface. A nonlimiting example of a record within the IoT knowledge structure 158 is provided in Table 2.

TABLE 2

```
"name": "device name",
"model": "model number",
"version": "version number",
"actions": [
    {
        "name": "action name",
        "command": "command or script location in device
        or
        script",
        "arguments": [
            "arg1",
            "arg2"
        ]
    }
]
}
```

Accordingly, the IoT knowledge structure 158 can specify an IoT device type (or edge device type) according to a device type identifier, or name, model number, version number, and/or other information. The IoT knowledge structure 158 can further specify a set of one or more actions that can be performed by the IoT devices 112 of that IoT device type. The actions can include an action name or identifier, a command that causes the action to be performed, and arguments that are provided to perform the action. The command can include a script and/or a location where a script is stored. The command can be provided in an appropriate protocol. The IoT knowledge structure 158 can also provide a list of deployed IoT devices 112 or edge devices 114 that correspond to the device type. The list can include IoT device identifiers and edge devices identifiers that are unique to a particular IoT device 112 or edge device 114.

The components executed on the computing environment 103 can include an evaluation service 160, as well as other applications, services, processes, systems, engines, or functionality not discussed in detail herein. The evaluation service 160 can provide an administrator console having one or more interfaces to create, read, update, or delete event definitions 144, IoT dependency graphs 156, and the IoT knowledge structure 158. In some examples, the evaluation service 160 includes a data point evaluator that evaluates IoT event data 154 and triggers the performance of an IoT dependency graph 156. If one or more steps of the IoT dependency graph fail after initiation, a notification or alert messages can be transmitted to an administrator, IT professional, or another user. Further, the evaluation service 160 can serve up one or more user interfaces that can be accessed by the client device 106 to read or acknowledge such notifications. The evaluation service 160 can be executed at a server layer, for example, in a local server or remote cloud server.

The evaluation service 160 can also be performed and executed in at an edge layer, such as in an edge device 114. The edge device 114 can store or otherwise have local access to the event definitions 144, IoT dependency graphs 156, and an IoT knowledge base or structure 158. The management service 120 can determine whether an IoT dependency graph 156 is evaluable at the edge layer. If the IoT dependency graph 156 specifies IoT devices 112 that are connected to a single edge device 114, then the IoT dependency graph is evaluable at an edge layer, and the management service 120 or evaluation service 160 can transmit the IoT dependency graph 156 to the specified edge device 114 for edge layer evaluation. However, if the IoT dependency graph 156 specifies IoT devices 112 that are connected to multiple different edge devices 114, then the management service 120 can store the IoT dependency graph 156 in the data store 142 for server layer evaluation.

The various physical and virtual components of the computing systems 109 can process workloads 180a . . . 180n. Workloads 180 can refer to the amount of processing that a server 124, switch 127, GPU 130, or other physical or virtual component has been instructed to process or route at a given time. The workloads 180 can be associated with virtual machines 136, public cloud services, private cloud services, hybrid cloud services, virtualization services, device management services, containers, or other software executing on the servers 124.

The IoT devices 112 can include "things" in the IoT networks, such as objects or devices having one or more sensors thereon, such as a camera, temperature sensor, humidity sensor, microphone or audio sensor, presence sensor, or other sensors. To this end, the IoT devices 112 can include touch sensors; physical input devices such as keypads, buttons, and switches; cameras; physical actuators, such as locks; automotive sensors, such as fuel sensors, temperature sensors, engine sensors, and tire sensors; manufacturing sensors, such as assembly line sensors; and industrial sensors, such as windmill and solar panel sensors.

In some examples, IoT devices 112 do not include a wide area network interface, but can include hardware to communicate IoT event data 154 to an edge device 114 located at or near the IoT devices 112. IoT event data 154 can correspond to states, actuator positions, online statuses, device settings, software errors, software versions, and other IoT events. IoT devices 112 can communicate data to edge devices 114 through connections that utilize Bluetooth®, Zigbee®, or other suitable IoT communication protocols. In some cases, the edge devices 114 can evaluate the IoT event data 154 at the edge layer, and in other cases, the edge devices 114 can relay or route the IoT event data 154 to the computing environment 103 for server layer evaluation. As such, the edge devices 114 can be referred to as gateways as they include a networking module that permits remote communication over the Internet or other suitable networks 122.

In some examples, an edge device 114 can include an agent application 169 that oversees operation of the edge device 114 as well as IoT devices 112 to which the edge device 114 is paired or assigned. The agent application 169 can include instructions that operate in conjunction with the management service 120. An IoT device 112 can include a smart lock that secures a door to a home or business using a keypad that requires entry of a predefined sequence of numbers to open. The IoT device 112 may not have the capability of communicating IoT event data 154 over the network 122, for instance, to a server 124 or the computing environment 103. As such, the IoT device 112 can collect successful or unsuccessful attempts to open the smart lock and send the data associated therewith to an edge device 114. The evaluation service 160 of the edge device 114 can evaluate the successful or unsuccessful attempts in order to initiate and/or perform sequenced events of an IoT dependency graph 156. Alternatively, the edge device 114 can forward the IoT event data 154 to the computing environment 103. The edge device 114 that lacks the evaluation service 160 can act as a proxy that routes the data to the computing environment 103 over the Internet.

FIG. 2A shows a graphical representation of an IoT dependency graph 156*a*. The IoT dependency graph 156*a* can include a directed acyclic graph, or a graph of another type of dependency structure. The evaluation service 160 can direct a dynamic chain of actions based on the IoT dependency graph 156*a*.

The IoT dependency graph 156*a* can be generated based on user-specified events entered through a console user interface of the management service 120. For example, the user can specify that IoT event A of IoT device T1 triggers IoT event B of IoT device T2. IoT event B of IoT device T2 triggers IoT event C of IoT device T3. Each of the events can be specified by a single user, or respective events can be specified by different respective users. In this example, the IoT devices T1, T2, and T3 can each be connected to a network 122 through edge device D1. The user can specify the edge devices manually, or the management service 120 can reference the IoT knowledge structure 158 to identify that IoT devices T1, T2, and T3 each connect through edge device D1.

The management service 120 or the evaluation service 160 can analyze these user-specified events to generate the IoT dependency graph 156*a*. The IoT dependency graph 156*a* can indicate a sequenced set of IoT events that includes IoT event A, IoT event B, and IoT event C. The sequence of events can be indicated by a parent identifier corresponding to one or more prerequisite events or actions. A nonlimiting example of the IoT dependency graph 156*a* is provided in Table 3.

TABLE 3

```
[
    {
        "event": "A",
        "thingId": "T1",
        "deviceId": "D1",
        "parentId": null
    },
    {
        "event": "B",
        "thingId": "T2",
        "deviceId": "D1",
        "parentId": "A"
    },
    {
        "event": "C",
        "thingId": "T3",
        "deviceId": "D1",
```

TABLE 3-continued

```
        "parentId": "B"
    },
]
```

In table 3, the prerequisites events are specified as parent identifiers corresponding to event identifiers, however, prerequisites can also refer to things, devices, and other identifiers. Multiple prerequisite events can be specified. The IoT event A can be considered an initial IoT event of the IoT dependency graph 156*a*. The IoT event A can specify an edge device identifier D1 of an edge device 114, an IoT device identifier T1 of an IoT device 112, and the IoT event A. In this example, the IoT event A can refer to a name or identifier associated with an action or multiple actions. IoT event A can include an action, state, or sensor reading associated with the IoT device T1. IoT event A can also specify conditions or parameters of the specified edge device D1. The initial IoT event A of the IoT dependency graph 156*a* can be utilized as a trigger to perform the rest of the IoT dependency graph 156*a*.

The evaluation service 160 can receive IoT event data 154 that specifies edge device identifier D1, IoT device identifier T1, and event identifier A. A nonlimiting example of the IoT event data 154 is provided in table 4.

TABLE 4

```
{
    "edgedeviceId": "D1",
    "thingId": "T1",
    "event": "event A"
}
```

IoT event A can correspond to reading a sensor parameter, activating an actuator, changing a configuration, and other actions. In other words, receiving IoT event data 154 specifying IoT event A can indicate that a sensor parameter has been read, that a configuration has changed, or than an actuator has been actuated. As a result, IoT event A can further specify a parameter value, a configuration, an actuator position, or other appropriate information.

The evaluation service 160 can determine that the initial IoT event A of IoT dependency graph 156*a* matches the received IoT event data 154. The evaluation service 160 can then perform the workflow specified according to IoT dependency graph 156*a*. Specifically, the evaluation service 160 can identify the next position in the IoT dependency graph 156*a*, and perform the IoT event B that is specified for that position. In other words, the evaluation service 160 can perform IoT event B in response to determining that the specified prerequisite or parent IoT event A is completed.

In order to perform IoT event B, the evaluation service 160 can query or search the IoT knowledge structure 158 based on IoT event B (or the action or parameter corresponding to IoT event B), IoT device T2, and/or edge device D1. The IoT knowledge structure 158 can specify a command to perform the event B. The IoT knowledge structure 158 can also specify a network endpoint of the IoT device T2 to transmit the command, and a storage location of the command. The evaluation service 160 can then transmit the command to perform IoT event B to the network endpoint of the IoT device T2. The IoT device T2 can return IoT event data 154 with a confirmation that the IoT event B has been performed.

Once IoT event B is performed, the evaluation service 160 can identify the next event or set of events in the IoT dependency graph 156a, and perform the specified event. Here, the next event is event C. The evaluation service 160 can also perform event C in response to determining that the specified prerequisite or parent IoT event B is completed. The evaluation service 160 can query or search the IoT knowledge structure 158 based on IoT event C, IoT device T3, and/or edge device D1 to identify a command to perform the IoT event C. The evaluation service 160 can transmit the command to perform IoT event C to the network endpoint of the IoT device T3.

Since all of the IoT devices specified in the IoT dependency graph 156a are connected to a single edge device D1, the IoT dependency graph 156a can be considered evaluable at an edge layer. The management service 120 can determine whether the hardware capabilities of the edge device D1 meet or exceed threshold hardware requirements to process the IoT dependency graph 156a, and store the IoT knowledge structure 158 and the IoT dependency graph 156a. The hardware requirements can include compute, memory, and data storage requirements. The management service 120 can transmit the IoT dependency graph 156a to the edge device D1 for edge layer evaluation if the edge device D1 is adequate to process the IoT dependency graph 156a.

FIG. 2B shows a graphical representation of an IoT dependency graph 156b. The IoT dependency graph 156b can include a directed acyclic graph, or a graph of another type of dependency structure. The evaluation service 160 can direct a dynamic chain of actions based on the IoT dependency graph 156b.

The IoT dependency graph 156b can indicate a sequenced set of IoT events that includes IoT event D, IoT event E, IoT event F, IoT event G, and IoT event H. IoT event D can specify an edge device identifier D1 of an edge device 114, an IoT device identifier T1 of an IoT device 112, and event D. Event D can include an event identifier and corresponding values for an action, state, or sensor reading associated with the IoT device T1. The event D can also specify conditions or parameters of the specified edge device D1. The initial IoT event A of the IoT dependency graph 156b can be utilized as a trigger to perform the rest of the IoT dependency graph 156b.

The evaluation service 160 can receive IoT event data 154 that specifies edge device identifier D1, IoT device identifier T1, and event identifier D. The evaluation service 160 can determine that the initial IoT event D of IoT dependency graph 156b matches the received IoT event data 154. The evaluation service 160 can then perform the workflow specified according to IoT dependency graph 156b. Specifically, the evaluation service 160 can identify the next position in the IoT dependency graph 156b, and perform the IoT events E, F, and G that are specified for that position. The IoT events E, F, and G can be performed simultaneously or concurrently. In other words, the evaluation service 160 can perform IoT events E, F, and G in response to determining that the shared prerequisite event D for each of these events is completed.

As mentioned above, the evaluation service 160 can query or search the IoT knowledge structure 158 based on the respective IoT events E, F, and G, as well as their corresponding IoT devices 112, and/or edge devices 114. In this example, IoT event E is performed by IoT device T2, IoT event F is performed by IoT device T3, and IoT event G is performed by IoT device T1. While IoT device T1 is connected through edge device D1, IoT devices T2 and T3 are connected to a different edge device D2. Since the IoT dependency graph 156b specifies more than one edge device 114, it is unevaluable at the edge layer, and should be stored and evaluated at a local or cloud server layer. The evaluation service 160 can identify and transmit commands corresponding to each of the IoT events E, F, and G. The IoT devices 112 can return confirmations that the IoT events have been performed.

Once IoT events E, F, and G are performed, the evaluation service 160 can identify the next event H that is specified according to the IoT dependency graph 156b. The evaluation service 160 can perform event H in response to determining that the specified prerequisite IoT events E, F, and G are all completed. The evaluation service 160 can query or search the IoT knowledge structure 158 based on IoT event H to identify a command to perform the IoT event H. The evaluation service 160 can transmit the command to perform IoT event H to a network endpoint of the IoT device T4.

Figure 3:
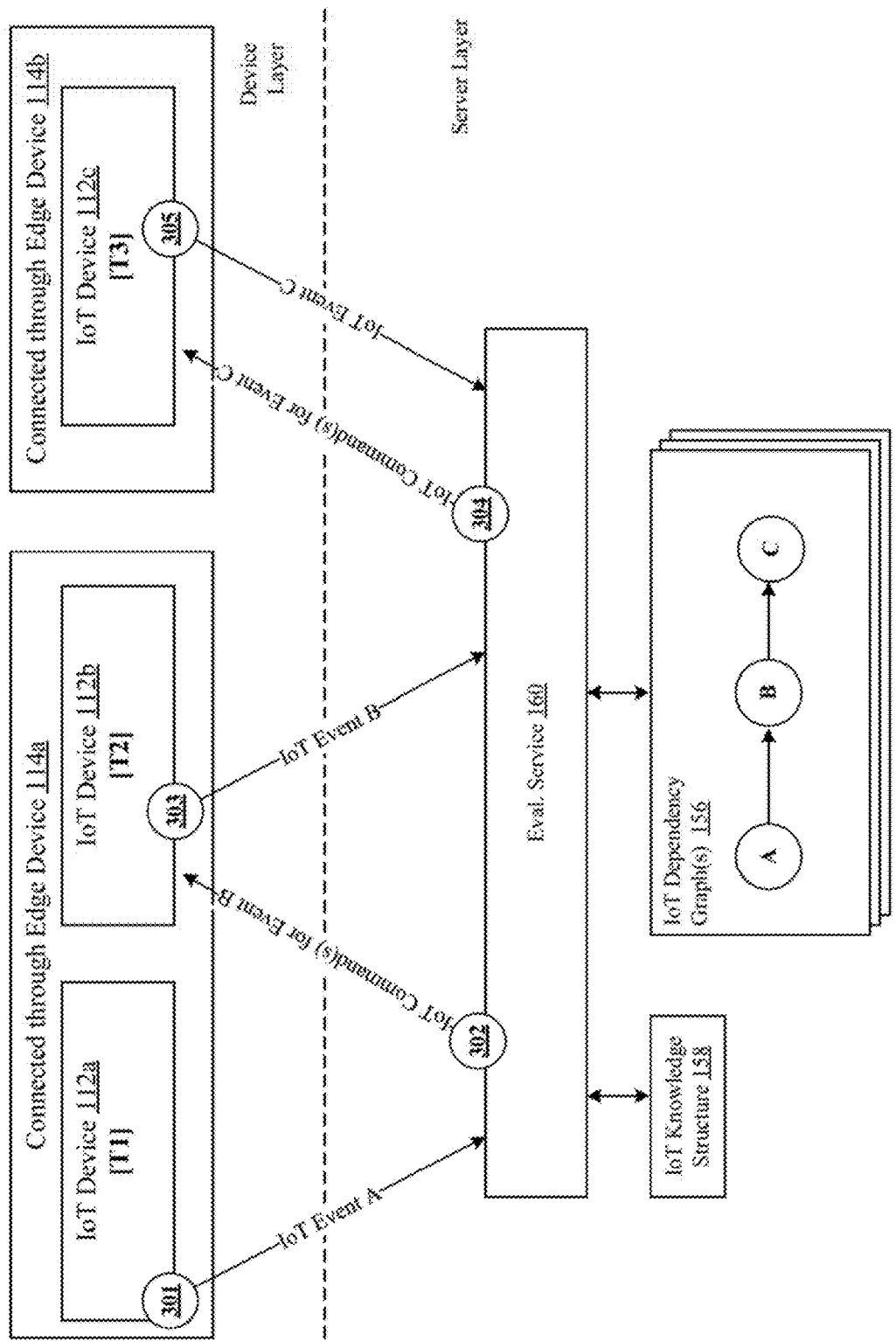
FIG. 3 is a schematic diagram that illustrates functionalities performed by components of the networked environment for a dynamic chain of actions.

FIG. 3 is a schematic diagram that illustrates functionalities performed by components of the networked environment 100 to perform a dynamic chain of actions based on an IoT dependency graph 156. The IoT dependency graph 156 can indicate a sequenced set of IoT events that includes IoT event A, IoT event B, and IoT event C.

IoT event A can specify an edge device identifier of an edge device 114a and an IoT device identifier of an IoT device 112a. IoT event A can include an event identifier and corresponding values for an action, state, or sensor reading associated with the IoT device 112a. IoT event A can also specify conditions or parameters of the specified edge device 114a. Initial IoT event A of the IoT dependency graph 156 can be utilized as a trigger to perform the rest of the IoT dependency graph 156.

IoT event B can specify an edge device identifier of an edge device 114a and an IoT device identifier of an IoT device 112b. IoT event B can include an event identifier for an action, state, or sensor reading associated with the IoT device 112b, as well conditions or parameters of the specified edge device 114a.

IoT event C can specify an edge device identifier of an edge device 114b and an IoT device identifier of an IoT device 112c. IoT event C can include an event identifier for an action, state, or sensor reading associated with the IoT device 112c, as well conditions or parameters of the specified edge device 114b. Since this IoT dependency graph 156 includes multiple edge devices 114, it is unevaluable at an edge layer, and should be stored and evaluated at a local or cloud server layer.

In step 301, the evaluation service 160 can receive IoT event data 154 that specifies IoT event A. For example, the IoT event data 154 can indicate that an action, state, or sensor reading corresponding to event A has been performed by IoT device 112a, which is connected to edge device 114a. The evaluation service 160 can determine that the initial IoT event A of IoT dependency graph 156 matches the received IoT event data 154, and perform the subsequent events according to the sequence specified in IoT dependency graph 156.

The evaluation service 160 can perform IoT event B in response to determining that its prerequisite event A is completed. The evaluation service 160 can query or search the IoT knowledge structure 158 based on the IoT event B, the IoT device 112b, and the edge devices 114a. The evaluation service 160 can identify, from the IoT knowledge structure 158, a command to perform IoT event B and a network endpoint of the IoT device 112b. The evaluation service 160 can retrieve all required commands before commencing the workflow or dynamic chain of events specified by the IoT knowledge structure 158.

In step 302, the evaluation service 160 can transmit the command to perform event B to the appropriate network endpoint of the IoT device 112b. The evaluation service 160 can transmit the command to the edge device 114a, which can relay the command to the IoT device 112b. The IoT device 112b can perform the event B according to the command, as well as any arguments or parameters specified.

In step 303, the IoT device 112b can return a confirmation that the event B is completed. The IoT device 112b can transmit IoT event data 154 for event B to the edge device 114a, which can route or relay this IoT event data 154 to the evaluation service 160. The evaluation service 160 can identify that the event B is completed and direct the performance of event C according to the IoT dependency graph 156. The evaluation service 160 can query or search the IoT knowledge structure 158 based on the IoT event C, the IoT device 112c, and the edge devices 114b. The evaluation service 160 can identify, from the IoT knowledge structure 158, a command to perform IoT event C and a network endpoint of the IoT device 112c.

In step 304, the evaluation service 160 can transmit the command to perform event C to the appropriate network endpoint of the IoT device 112c. The evaluation service 160 can transmit the command to the edge device 114b, which can relay the command to the IoT device 112c. The IoT device 112c can perform the event C according to the command, along with any arguments or parameters that are specified.

In step 305, the IoT device 112c can return a confirmation that the event C is completed. The IoT device 112c can transmit IoT event data 154 for event C to the edge device 114b, which can route or relay this IoT event data 154 to the evaluation service 160.

Figure 4:
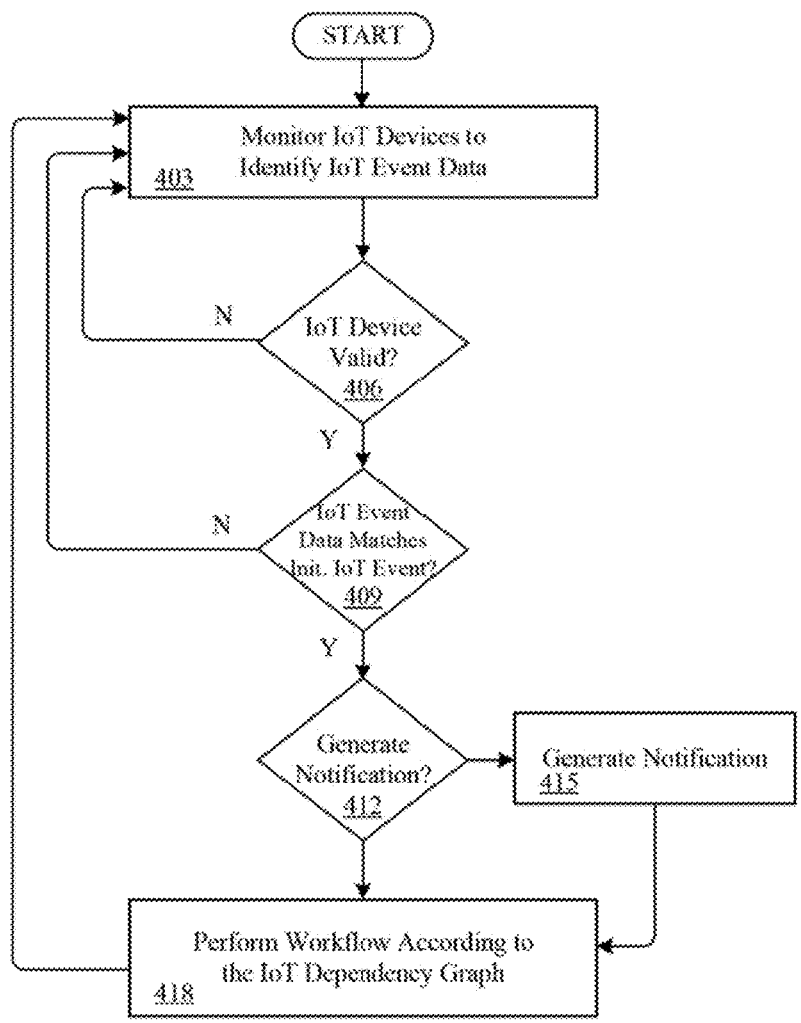
FIG. 4 is a flowchart that illustrates functionalities performed by components of the networked environment for a dynamic chain of actions.

Moving to FIG. 4, a flowchart is shown that provides one example of the operation of a portion of the networked environment 100. While the flowchart of FIG. 4 can generally be viewed as depicting an example of elements of a method implemented by the evaluation service 160 executing in the computing environment 103, additional functionality is performed by other components of the networked environment 100. The separation or segmentation of functionality as discussed herein is presented for illustrative purposes only. Steps can be omitted or scrambled in relative order as compared to the order shown and described.

In step 403, the evaluation service 160 can monitor IoT devices 112 to identify IoT event data 154. The IoT event data 154 can include information about an IoT event that has occurred with respect to an IoT device 112. IoT event data 154 can specify an edge device identifier of an edge device 114 and an IoT device identifier of an IoT device 112. IoT event data 154 can include an event identifier and corresponding values for an action, state, or sensor reading associated with the IoT device 112.

In step 406, the evaluation service 160 can determine whether the IoT device 112 is valid. For example, if the IoT event data 154 is received from an IoT device 112 that is enrolled or registered with the management service 120, then the IoT device 112 can be considered valid. The evaluation service 160 can access or query the IoT knowledge structure 158 to determine whether a device record associated with the IoT device 112 exists, and whether the record indicates that the IoT device 112 is enrolled and registered. In some cases, a compliance status of the IoT device 112 can also be required for the IoT device 112 to be considered valid. If the IoT device 112 is valid the process can move to step 409.

In step 409, the evaluation service 160 can determine whether the IoT event data 154 matches an initial IoT event specified in an IoT dependency graph 156. The initial IoT event of the IoT dependency graph 156 can be a first IoT event or an IoT event that specifies no prerequisite events. For example, if the initial IoT event of the IoT dependency graph 156 indicates the same edge device identifier, IoT device identifier, as well as the same event identifier and corresponding values as the IoT event data 154, then the IoT event data 154 matches the initial IoT event. If the IoT event data 154 matches the initial IoT event the process can move to step 412.

In step 412, the evaluation service 160 can determine whether to generate a notification. For example, a notification setting can be configured through a console user interface of the management service 120. The notification setting can indicate whether initiation of all, or individual ones, of the IoT dependency graphs 156 should cause a notification to be transmitted to a client device or provided through the console user interface.

In step 415, a notification can be generated. For example, if the notification setting indicates that initiation of the matching IoT dependency graph 156, or all IoT dependency graphs 156, should result in a notification, then the evaluation service 160 can generate and transmit the notification.

In step 418, the evaluation service 160 can perform a workflow or dynamic chain of actions according to the IoT dependency graph 156. For example, the evaluation service 160 can analyze the IoT dependency graph 156 to identify each respective IoT event specified, retrieve appropriate commands from an IoT knowledge structure 158, and transmit the commands to IoT devices in the sequence specified by the IoT dependency graph 156. This process is discussed further with respect to FIG. 5.

Figure 5:
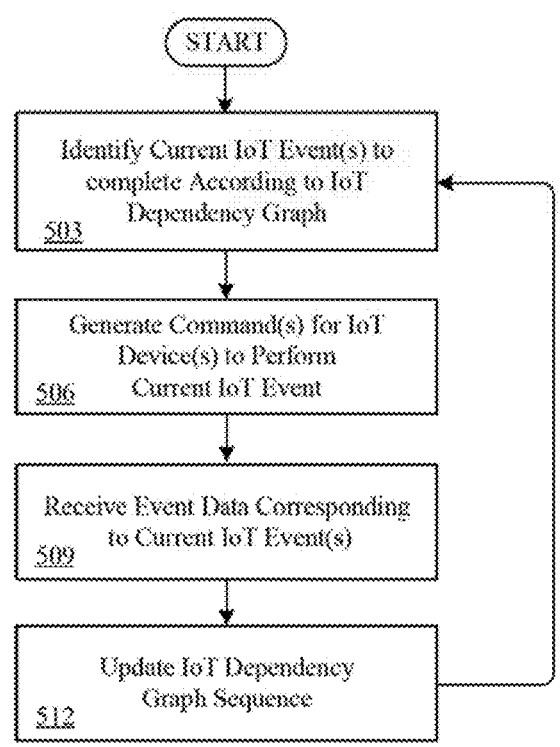
FIG. 5 is another flowchart that illustrates functionalities performed by components of the networked environment for a dynamic chain of actions.

FIG. 5 shows a flowchart that provides one example of the operation of a portion of the networked environment 100. While the flowchart of FIG. 5 can be viewed as depicting an example of elements of a method implemented by the evaluation service 160 executing in the computing environment 103, additional functionality is performed by other components of the networked environment 100. Generally, FIG. 5 shows how the evaluation service 160 can perform a dynamic chain of actions or workflow specified in an IoT dependency graph 156 that has been initiated. The separation or segmentation of functionality as discussed herein is presented for illustrative purposes only. Steps can be omitted or scrambled in relative order as compared to the order shown and described.

In step 503, the evaluation service 160 can identify a current IoT event or events specified in an IoT dependency graph 156 that has been initiated. As discussed above, the IoT dependency graph can be initiated once received IoT event data 154 indicates that an initial event specified in the IoT dependency graph 156 has occurred. The evaluation service 160 can analyze the IoT dependency graph 156 to identify one or more current IoT events that indicate the initial event as a prerequisite. As a result, the current IoT event refers to an IoT event that is subsequent to the initial IoT event of the IoT dependency graph 156. Since the process is iterative, in later iterations, the evaluation service 160 can analyze the IoT dependency graph 156 to identify one or more current IoT events that indicate any previously completed event as a prerequisite event. Multiple events can be indicated as prerequisite events.

In step 506, the evaluation service 160 can generate a command for one or more current IoT events. Once a current IoT event is identified for the previously completed event, the evaluation service 160 can identify how to direct an IoT device 112 specified for the current IoT event to perform the IoT event. For example, the evaluation service 160 can query or access an IoT knowledge structure 158 based on the current IoT event and identify commands that cause the IoT device 112 to perform the current IoT event. The evaluation service 160 can then transmit the command to the IoT device 112 to perform the current IoT event.

In step 509, the evaluation service 160 can receive IoT event data 154 corresponding to the current IoT event. The received IoT event data 154 can indicate that the current IoT event has been completed by the IoT device 112. If the current event fails to complete within a predetermined time period, the evaluation service 160 can retry by re-sending the command to perform the current IoT event. After a predetermined number of retries, or another predetermined time period, the evaluation service 160 can generate and provide an IT professional with a notification to manually complete the IoT event or otherwise service the specified IoT device 112.

In step 512, the evaluation service 160 can update a graph sequence of the IoT dependency graph 156. For example, the evaluation service can maintain a graph sequence for the IoT dependency graph 156 that is being performed. The graph sequence can indicate a completion status for each IoT event specified in the IoT dependency graph 156. Once the current IoT event is completed, the graph sequence can be updated to indicate a complete status rather than an incomplete status for the current IoT event. The evaluation service 160 can then move to step 503 in an iterative process, until the graph sequence indicates that all of the IoT events specified in the IoT dependency graph 156 are completed.

Stored in the device memory are both data and several components that are executable by the processor. Also stored in the memory can be a data store and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the computing environment 103. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touch-screen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
    at least one computing device; and
    program instructions stored in at least one memory of the at least one computing device, wherein the instructions, when executed by at least one processor, cause the at least one computing device to at least:
        receive Internet-of-Things (IoT) event data from an IoT device;
        identify an IoT dependency graph that is identified based on an initial IoT event specified by the IoT dependency graph corresponding to the IoT event data;
        identify at least one IoT event subsequent to the initial IoT event in the IoT dependency graph;
        determine, by a server-layer device of a computing environment comprising a server layer and an edge layer, that the IoT dependency graph is evaluable at the edge layer based on the IoT dependency graph specifying a single edge device as an edge device through which a respective one of a plurality of IoT devices in the IoT dependency graph perform network communications; and
        transmit, by the server-layer device to the single edge device, the IoT dependency graph to the single edge device, wherein the single edge device transmits, to at least one IoT device, at least one command for the at least one IoT device to perform the at least one IoT event.

2. The system of claim 1, wherein the instructions, when executed by the at least one processor, cause the at least one computing device to at least:
    receive, from a respective IoT device of the at least one IoT device, an IoT event confirmation; and
    update an IoT graph sequence of the IoT dependency graph based on the IoT event confirmation.

3. The system of claim 1, wherein the instructions, when executed by the at least one processor, cause the at least one computing device to at least:
    retrieve, from an IoT knowledge structure, instructions to perform the at least one IoT event; and
    generate, based on the instructions, the at least one command for the at least one IoT device to perform the at least one IoT event.

4. The system of claim 1, wherein the IoT dependency graph comprises a directed acyclic graph.

5. The system of claim 1, wherein the IoT dependency graph specifies, for at least one event of a plurality of events of the IoT dependency graph: an event identifier, an IoT device identifier, an edge device identifier, and a parent event identifier.

6. The system of claim 1, wherein the instructions, when executed by the at least one processor, cause the at least one computing device to at least:
    determine that a second IoT dependency graph is unevaluable at the edge layer based on the second IoT dependency graph specifying a second plurality of IoT devices that are connected to a plurality of different edge devices; and
    store the second IoT dependency graph at the server layer for server layer evaluation based on the IoT dependency graph being unevaluable at the edge layer.

7. The system of claim 1, wherein the IoT event data comprises an edge device identifier, an IoT device identifier, and an event identifier.

8. A method performed by instructions executed by at least one computing device, the method comprising:
    receiving, by the at least one computing device, Internet-of-Things (IoT) event data from an IoT device;
    identifying, by the at least one computing device, an IoT dependency graph that is identified based on an initial IoT event specified by the IoT dependency graph corresponding to the IoT event data;
    identifying, by the at least one computing device, at least one IoT event subsequent to the initial IoT event in the IoT dependency graph
    determining, by a server-layer device of a computing environment comprising a server layer and an edge layer, that the IoT dependency graph is evaluable at the edge layer based on the IoT dependency graph specifying a single edge device as an edge device through which a respective one of a plurality of IoT devices in the IoT dependency graph perform network communications; and
    transmitting, by the server-layer device to the single edge device, the IoT dependency graph to the single edge device, wherein the single edge device transmits, to at least one IoT device, at least one command for the at least one IoT device to perform the at least one IoT event.

9. The method of claim 8, further comprising:
    receiving, from a respective IoT device of the at least one IoT device, an IoT event confirmation; and
    updating an IoT graph sequence of the IoT dependency graph based on the IoT event confirmation.

10. The method of claim 8, further comprising:
    retrieving, from an IoT knowledge structure, instructions to perform the at least one IoT event; and
    generating, based on the instructions, the at least one command for the at least one IoT device to perform the at least one IoT event.

11. The method of claim 8, wherein the IoT dependency graph comprises a directed acyclic graph.

12. The method of claim 8, wherein the IoT dependency graph specifies, for at least one event of a plurality of events of the IoT dependency graph: an event identifier, an IoT device identifier, an edge device identifier, and a parent event identifier.

13. The method of claim 8, further comprising:
    determining that a second IoT dependency graph is unevaluable at the edge layer based on the second IoT dependency graph specifying a second plurality of IoT devices that are connected to a plurality of different edge devices; and storing the second IoT dependency graph at the server layer for server layer evaluation based on the IoT dependency graph being unevaluable at the edge layer.

14. The method of claim 8, wherein the IoT event data comprises an edge device identifier, an IoT device identifier, and an event identifier.

15. A non-transitory computer-readable medium comprising program instructions that when executed by at least one processor, cause at least one computing device to at least:

receive Internet-of Things (IoT) event data from an IoT device;

identify an IoT dependency graph that is identified based on an initial IoT event specified by the IoT dependency graph corresponding to the IoT event data;

identify at least one IoT event subsequent to the initial IoT event in the IoT dependency graph;

determine, by a server-layer device of a computing environment comprising a server layer and an edge layer, that the IoT dependency graph is evaluable at the edge layer based on the IoT dependency graph specifying a single edge device as an edge device through which a respective one of a plurality of IoT devices in the IoT dependency graph perform network communications; and transmit, by the server-layer device to the single edge device, the IoT dependency graph to the single edge device, wherein the single edge device transmits, to at least one IoT device, at least one command for the at least one IoT device to perform the at least one IoT event.

16. The non-transitory computer-readable medium of claim 15, wherein the instructions, when executed by the at least one processor, cause the at least one computing device to at least:

receive, from a respective IoT device of the at least one IoT device, an IoT event confirmation; and update an IoT graph sequence of the IoT dependency graph based on the IoT event confirmation.

17. The non-transitory computer-readable medium of claim 15, wherein the instructions, when executed by the at least one processor, cause the at least one computing device to at least:

retrieve, from an IoT knowledge structure, instructions to perform the at least one IoT event; and generate, based on the instructions, the at least one command for the at least one IoT device to perform the at least one IoT event.

18. The non-transitory computer-readable medium of claim 15, wherein the IoT dependency graph comprises a directed acyclic graph.

19. The non-transitory computer-readable medium of claim 15, wherein the IoT dependency graph specifies, for at least one event of a plurality of events of the IoT dependency graph: an event identifier, an IoT device identifier, an edge device identifier, and a parent event identifier.

20. The non-transitory computer-readable medium of claim 15, wherein the instructions, when executed by the at least one processor, cause the at least one computing device to at least:

determine that a second IoT dependency graph is unevaluable at the edge layer based on the second IoT dependency graph specifying a second plurality of IoT devices that are connected to a plurality of different edge devices; and store the second IoT dependency graph at the server layer for server layer evaluation based on the IoT dependency graph being unevaluable at the edge layer.

* * * * *